Jan. 10, 1961  O. FLINT  2,967,811
FUEL ELEMENTS FOR THERMAL-FISSION NUCLEAR REACTORS
Filed March 20, 1951
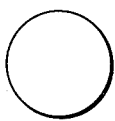
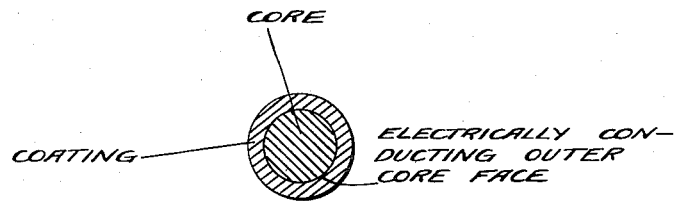
INVENTOR
OLIVER FLINT,
BY
ATTORNEY

United States Patent Office 2,967,811
Patented Jan. 10, 1961

2,967,811

FUEL ELEMENTS FOR THERMAL-FISSION NUCLEAR REACTORS

Oliver Flint, Strand, London, England, assignor, by direct and mesne assignments, to the United States of America as represented by the United States Atomic Energy Commission Filed Mar. 20, 1951, Ser. No. 216,607

7 Claims. (Cl. 204—193.2)

This invention relates to fuel elements for thermal-fission nuclear reactors, and has for object to provide a simple and efficient form of such a fuel element.

In accordance with the invention a fuel element for a thermal-fission nuclear reactor comprises a core of moderator material having an electrically conductive outer face and a coating of a substance which is fissile by thermal neutrons on the said outer face.

The fuel element may conveniently take the form of a small sphere and the core is preferably formed of a refractory material preferably refractory oxide, having the desired properties of a moderator. Preferred materials for the core are beryllia, magnesia and alumina.

In the drawings, Fig. 1 shows a sphere according to the invention and Fig. 2 is a sectional view through the center thereof.

In the preparation of fuel elements of the invention cores of moderator material may be provided with an electrically conducting outer face, as by applying a coating of graphite or depositing a film of metal for example copper, silver or nickel thereon by reduction from a solution of a compound of the metal, or by electro-deposition or by applying a coating of metal powder to an adhesive film on the core and sintering the metal powder coating to form a continuous or conductive coating. Where a metal is employed for the outer face of the core, it is preferred in general to employ a metal of low thermal neutron absorption cross-section; but in the case of films of metal which may be of very small thickness, for example 150–250 A., as prepared by reduction, metals of substantial thermal neutron absorption cross-section may be used, as in the case of silver mentioned above. Fissile material, such as oxide of U 235, U 233, or Pu 239 may then be deposited on the electrically conducting outer face by electro-deposition from an alkaline solution of a salt of the fissile metal, preferably using low current density.

The following are examples of preferred ways of carrying the invention into effect as applied to small spheres of sintered refractory metal oxides.

Example 1

Small spheres of sintered beryllia are soaked in distilled water for approximately ten minutes, removed from the water, drained and transferred to a solution comprising 10 percent copper sulphate in 2 N ammonium hydroxide decolourised with a 5 percent solution of hydrazine sulphate, sufficient sodium hydroxide being added to precipitate yellow cuprous oxide. The solution is heated to boiling and reaction commences. The spheres are kept moving in the solution until evolution of nitrogen ceases, and are then removed from the solution and dried by hot air blast. The films of copper so produced can be buffed gently with a smooth velvet cloth to give smooth coatings.

A solution containing 10 gm. of potassium hydroxide and 20 gm. of potassium carbonate per litre was prepared and added in the proportion of 750 ml. to 250 ml. of a solution containing 40 gm. of uranyl (U 235) nitrate per litre. The precipitate formed on mixing the solutions was redissolved with 2 N nitric acid and ammonium hydroxide was added to raise the pH to pH 10. The resulting solution consisting of ammonium di-uranate together with potassium and ammonium nitrates was employed as electrolyte for deposition of oxide of U 235 on the coated beryllia spheres, employing an inert anode (preferably platinum), a temperature of 15–20° C. and a current density of substantially 10 m.amp. per square centimetre of sphere surface. The spheres may be tumbled to ensure uniformity of coating. The pH is maintained at pH 10 to 10.5 by addition of ammonium hydroxide. After 90 minutes deposition a film of substantially 0.13 mg. per square centimetre was formed. The oxide coating was iridescent showing interference colours on a black background. The film may be ignited to 500° C. to remove volatile impurities and without being loosened or ruptured.

Example 2

Sintered magnesia spheres soaked in distilled water for 10 minutes are immersed in 10 percent stannous chloride solution containing 5 percent hydrochloric acid for 5 minutes, and after washing well are transferred to an ammoniacal silver solution prepared by adding ammonium hydroxide to a 10 percent aqueous silver nitrate solution to redissolve the brown precipitate originally formed. After substantially one minute's immersion the spheres are transferred to a solution containing 20 percent sodium hydroxide and 10 percent sodium potassium tartrate for substantially 3 minutes. They are then removed, washed and replaced in the silver solution for a further three minutes, removed and washed. The treatment is repeated until a grey-ivory coating is produced. Three treatments may be sufficient. The coating can be buffed with a velvet cloth. During the immersion in the several solutions movement of the spheres should be continuous to ensure uniform treatment.

The magnesia spheres with their silver coating may be treated as described in Example 1 for the electro-deposition of a coating of uranium oxide.

Example 3

Sintered beryllia spheres are immersed in an aqueous dispersion of graphite, prepared for example by diluting "Aqua-dag" with an equal volume of water. After one minute's immersion they are removed and dried by hot air blast. Immersion and drying are repeated until a coating is formed which has a resistance of not more than 200 ohms per linear inch. The coated spheres may then have a coating of uranium oxide electro-deposited thereon in the manner described in Example 1.

Example 4

Sintered alumina spheres are sprayed with colourless cellulose ester lacquer and while the lacquer is tacky copper powder is blown on by means of an insufflator charged with the powder. An even coating of the powder on the spheres is desired. The spheres are then placed in a furnace, the temperature of which is slowly raised to the sintering point of the copper powder. An evenly and thinly applied film of copper powder will in this way form a sealed coating preventing subsequent absorption of electrolytes. The spheres so coated may then be coated with uranium oxide as described in Example 1.

Coatings of the oxide of Pu 239 may be deposited on refractory oxide cores in a manner similar to that described in Example 1.

I claim:

1. A fuel element for a thermal fission nuclear reactor comprising a core of beryllia, a film of metal on the outer face of the core and a coating of an oxide of a metal isotope of the class consisting of U 235, U 233 and Pu 239 on the said film of metal.

2. A fuel element for a thermal fission nuclear reactor comprising a core of magnesia, a film of metal on the outer face of the core and a coating of an oxide of a metal isotope of the class consisting of U 235, U 233, and Pu 239 on the said film of metal.

3. A fuel element for a thermal fission nuclear reactor comprising a core of a refractory oxide of the class consisting of beryllia, magnesia and alumina, a film of a metal of the class consisting of copper, silver, nickel on the outer face of the core and a coating of an oxide of a metal isotope of the class consisting of U 235, U 233 and Pu 239 on the said film of metal.

4. A method of producing a fuel element for a thermal fission nuclear reactor wherein a core of a refractory oxide of the class consisting of beryllia, magnesia and alumina is provided with a film of electrically conducting substance on its outer surface and a coating of an oxide of a metal isotope of the class consisting of U 235, U 233 and Pu 239 fissile by thermal neutrons is deposited on the film by electrodeposition.

5. A method of producing a fuel element for a thermal fission nuclear reactor wherein a core of refractory oxide of the class consisting of beryllia, magnesia and alumina is provided with a film of a metal of the class copper, nickel and silver by reduction of the metal from a solution of a compound of the metal and an oxide of a metal isotope of the class consisting of U 235, U 233 and Pu 239 fissile by thermal neutrons is deposited on the film by electrodeposition from an alkaline solution of a salt of the fissile metal isotope.

6. A method according to claim 5 wherein the alkaline solution of a salt of the fissile metal isotope contains ammonium diuranate.

7. A fuel element for a thermal fission nuclear reactor comprising a core of refractory metal oxide, of the class consisting of beryllia, magnesia, and alumina, a film of graphite on the outer face of the core and a coating of a substance of the class consisting of U 235, U 233 and Pu 239 on the said film of graphite.

References Cited in the file of this patent

UNITED STATES PATENTS

| | | |
|---|---|---|
| 484,553 | Jones | Oct. 18, 1892 |
| 1,487,174 | Marden et al. | Mar. 18, 1924 |
| 1,759,454 | Heany | May 20, 1930 |
| 2,708,656 | Fermi et al. | May 17, 1955 |

FOREIGN PATENTS

| | | |
|---|---|---|
| 233,011 | Sweden | Oct. 2, 1944 |

OTHER REFERENCES

Nucleonics, December 1949, pp. 45–49.

Friend: "Textbook of Inorganic Chemistry," vol. VII, part III, pages 272–351 (1926), published by Charles Griffin and Co., Ltd., London (pages 279(3), 289 and 290 especially relied upon). (Copy in Scientific Library.)

Emelius: Nature, volume 163, No. 4147, page 624, April 23, 1949. (Copy in Patent Office Library.)

Goodman: "The Science and Engineering of Nuclear Power," volume 1, pages 406 and 480, Addison-Wesley Press, Inc., Cambridge, Mass. (1947). (Copy in Patent Office Library.)

Smyth: "Atomic Energy for Military Purposes," pages 103, 104, August 1945. Copy may be purchased from Supt. of Documents, Washington 25, D.C.